US012427612B2

(12) United States Patent
Zimmer et al.

(10) Patent No.: US 12,427,612 B2
(45) Date of Patent: Sep. 30, 2025

(54) WORKPIECE CARRIAGE, AND MACHINE TOOL AND MANUFACTURING CELL HAVING SUCH A WORKPIECE CARRIAGE

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 567 days.

(21) Appl. No.: 17/775,508

(22) PCT Filed: Nov. 8, 2020

(86) PCT No.: PCT/DE2020/000273
§ 371 (c)(1),
(2) Date: May 9, 2022

(87) PCT Pub. No.: WO2021/089075
PCT Pub. Date: May 14, 2021

(65) Prior Publication Data
US 2022/0379417 A1 Dec. 1, 2022

(30) Foreign Application Priority Data
Nov. 10, 2019 (DE) ...................... 10 2019 007 764.4

(51) Int. Cl.
B23Q 1/62 (2006.01)
B23Q 3/08 (2006.01)
B23Q 7/05 (2006.01)

(52) U.S. Cl.
CPC ............ *B23Q 1/626* (2013.01); *B23Q 3/088* (2013.01); *B23Q 7/05* (2013.01); *B23Q 2703/04* (2013.01)

(58) Field of Classification Search
CPC .......... B23Q 1/035; B23Q 1/037; B23Q 1/42; B23Q 1/626; B23Q 3/102; B25B 1/2484;
(Continued)

(56) References Cited

U.S. PATENT DOCUMENTS 4,570,505 A * 2/1986 Peterson ............. F16H 57/0406
74/467
5,170,876 A 12/1992 Sticht
(Continued)

FOREIGN PATENT DOCUMENTS

CN 101143467 A 3/2008
CN 203171150 U 9/2013
(Continued)

OTHER PUBLICATIONS

Zimmer, Martin et al., co-pending U.S. Appl. No. 17/775,474, filed May 9, 2022, U.S. national phase entry of PCT/DE2020/000271.
(Continued)

*Primary Examiner* — Tyrone V Hall, Jr.
(74) *Attorney, Agent, or Firm* — Smartpat PLC

(57) ABSTRACT

A workpiece carriage for workpiece transport includes a guide unit oriented in a longitudinal direction, a drive unit having an electrical supply and a drive motor, and a workpiece gripping unit having two clamping jaws movable relative to one another. A machine tool includes at least one workpiece table, with at least one tool unit movable relative to the workpiece table and with at least two workpiece carriages that are displaceable individually in the longitudinal direction along a machine bed of the machine tool. A manufacturing cell includes such a machine tool and a workpiece supply. The two clamping jaws of the workpiece gripping unit can be displaced relative to one another in a height direction oriented normal to the longitudinal direction and normal to a transverse direction oriented normal to the longitudinal direction. This expands the possible applications of the workpiece carriage.

15 Claims, 8 Drawing Sheets

(58) Field of Classification Search
CPC ..... B25B 1/2489; B25B 5/006; B25H 1/0078; B25H 1/10
See application file for complete search history.

(56) References Cited

U.S. PATENT DOCUMENTS

| | | | | |
|---|---|---|---|---|
| 5,613,793 | A | * | 3/1997 | Dennis ................ F16B 12/14 403/256 |
| 6,067,695 | A | | 5/2000 | Momoitio |
| 6,764,434 | B1 | | 7/2004 | Volk |
| 2002/0074703 | A1 | | 6/2002 | Schmalz et al. |
| 2002/0078809 | A1 | | 6/2002 | Schmidt |
| 2005/0076495 | A1 | * | 4/2005 | Kelley ................ B23Q 3/18 29/721 |
| 2012/0195718 | A1 | | 8/2012 | Grob |
| 2014/0230230 | A1 | * | 8/2014 | Gao ................ B25B 5/006 29/559 |
| 2017/0297218 | A1 | * | 10/2017 | Friese ................ B25B 5/142 |
| 2018/0250781 | A1 | | 9/2018 | Gauli |
| 2019/0047799 | A1 | * | 2/2019 | Spotti ............... H01L 21/67709 |
| 2021/0129271 | A1 | | 5/2021 | Süss |

FOREIGN PATENT DOCUMENTS

| | | | |
|---|---|---|---|
| CN | 204036024 | U | 12/2014 |
| CN | 105437177 | A | 3/2016 |
| CN | 102626884 | B | 8/2016 |
| CN | 106794594 | A | 5/2017 |
| CN | 107649790 | A | 2/2018 |
| CN | 109676704 | A | 4/2019 |
| CN | 110087824 | A | 8/2019 |
| CN | 110234465 | A | 9/2019 |
| CN | 110355830 | A | 10/2019 |
| CN | 110385557 | A | 10/2019 |
| CN | 107243742 | B | 3/2023 |
| DE | 3317305 | A1 | 11/1984 |
| DE | 3721610 | A1 | 1/1989 |
| DE | 29807071 | U1 | 7/1998 |
| DE | 19631661 | C2 * | 5/2000 ........... B23Q 1/0009 |
| DE | 20309779 | U1 | 9/2003 |
| DE | 10214554 | A1 | 10/2003 |
| DE | 102004053519 | | 5/2006 |
| DE | 102006027013 | | 1/2008 |
| DE | 102007044589 | A1 | 4/2008 |
| DE | 202011002384 | U1 | 5/2012 |
| DE | 102015212541 | A1 | 3/2016 |
| DE | 102017012077 | A1 | 7/2018 |
| DE | 102017104246 | A1 | 9/2018 |
| EP | 0835720 | A1 | 4/1998 |
| EP | 1188697 | A1 | 3/2002 |
| EP | 1205268 | A1 | 5/2002 |
| EP | 1810803 | A1 | 7/2007 |
| EP | 2153955 | B1 | 12/2012 |
| EP | 3750677 | A1 | 12/2020 |
| ES | 2146138 | | 7/2000 |
| FR | 3056932 | A1 | 4/2018 |
| JP | 2009178797 | A | 8/2009 |
| WO | 03097296 | A1 | 11/2003 |
| WO | 2014177997 | A1 | 11/2014 |

OTHER PUBLICATIONS

Zimmer, Martin et al., co-pending U.S. Appl. No. 17/775,498, filed May 9, 2022, U.S. national phase entry of PCT/DE2020/000272.

* cited by examiner

WORKPIECE CARRIAGE, AND MACHINE TOOL AND MANUFACTURING CELL HAVING SUCH A WORKPIECE CARRIAGE

TECHNICAL FIELD

The disclosure relates to a workpiece carriage for workpiece transport.

BACKGROUND

From DE 10 2017 012 077 A1, a workpiece carriage for use in manufacturing cells with machining robots is known.

SUMMARY

The disclosure relates to a workpiece carriage for workpiece transport, with a guide unit oriented in a longitudinal direction, with a drive unit having an electrical supply and a drive motor, and with a workpiece gripping unit having two clamping jaws movable relative to one another, a machine tool with at least one workpiece table, with at least one tool unit movable relative to the workpiece table and with at least two workpiece carriages that are displaceable individually in the longitudinal direction along a machine bed of the machine tool, along with a manufacturing cell with such a machine tool and with a workpiece supply.

In order to extend the possible applications of the workpiece carriage, the two clamping jaws of the workpiece gripping unit can be displaced relative to one another in a height direction oriented normal to the longitudinal direction and normal to a transverse direction oriented normal to the longitudinal direction.

The workpiece carriage is designed to hold horizontally arranged plate-type or board-type workpieces. Such workpieces are made of, for example, wood, aluminum, steel, plastic, a composite material, etc. The workpiece position enables both the use of machining robots and the use of tool gantries for workpiece machining. The workpiece carriages can be used in manufacturing cells with machine tools that have, for example, two workpiece paths that are parallel to one another. With such an arrangement, a workpiece supply in the working region can be carried out in time during the machining of a preceding workpiece. This allows a high output rate of the manufacturing cell to be achieved.

Further details of the invention will be apparent from the following description of schematically illustrated embodiments.

DETAILED DESCRIPTION

Figure 1:
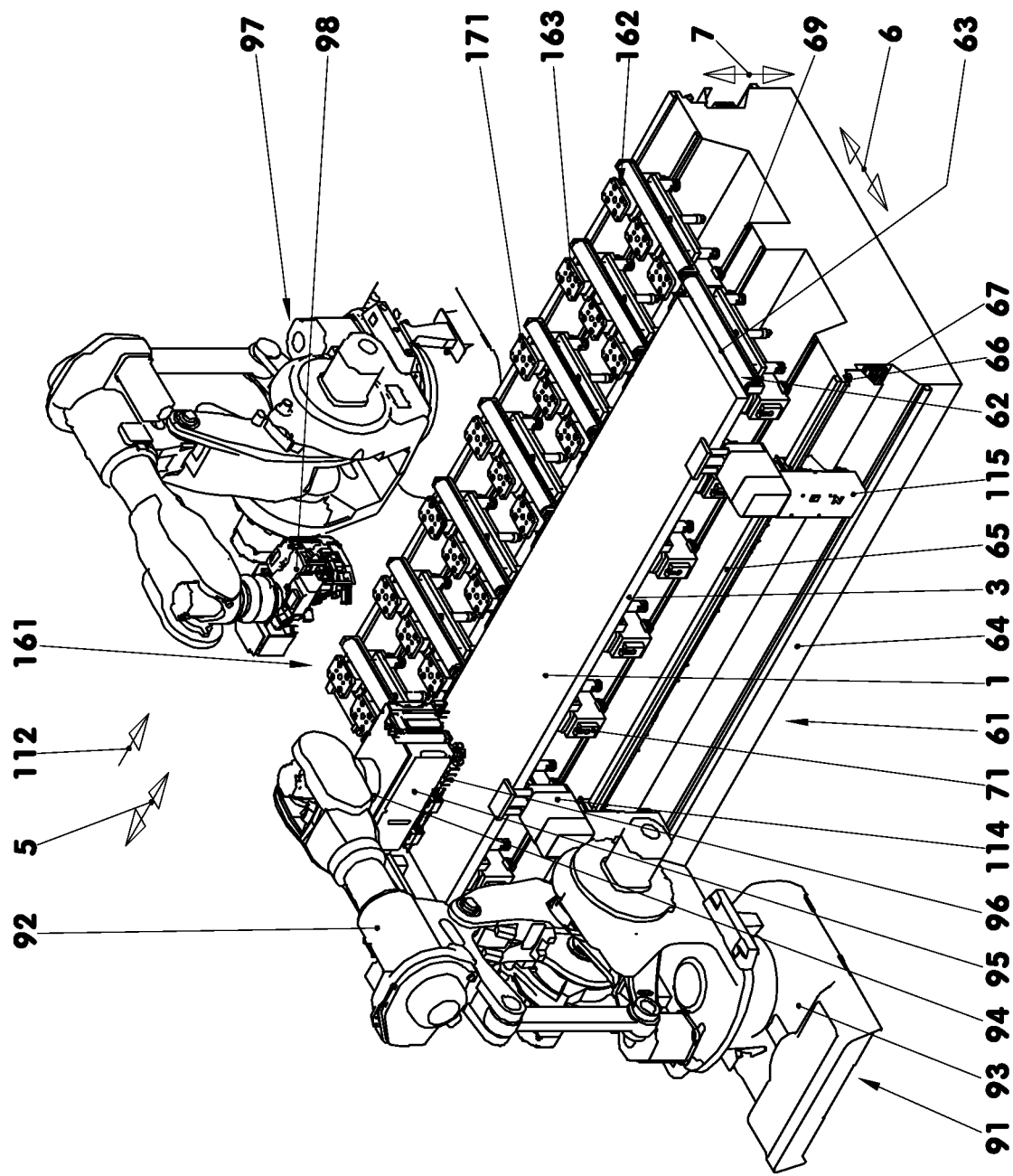
FIG. 1: Machine tool with machining robots.

FIG. 1 shows a machine tool (61) with two adjacent workpiece paths (62, 162) that are parallel to one another, and two machining robots (91, 97). The machine tool (61) can also be designed with only a single workpiece path (62; 162). The machine tool (61) has a machine bed (64) on each of whose two longitudinal sides oriented in the longitudinal direction (5) run a workpiece carriage guide rail (65), a toothed rack (66) and a power and signal conductor path (67). For example, a workpiece carriage guide rail (65), a toothed rack (66) and a power and signal conductor path (67) are each assigned a workpiece path (62; 162). Workpiece carriages (114-117) can be displaced in the longitudinal direction (5) along each workpiece carriage guide rail (65). Such workpiece carriages (114-117) hold a plate-shaped workpiece (1; 2), for example a wooden plate, in the illustration of FIG. 1.

The machine tool (61) comprises one workpiece table (63; 163) per workpiece path (62; 162). The single workpiece table (62; 162) has at least one suction block assembly (71; 171), which is oriented in the transverse direction (6). In the exemplary embodiment, the machine tool (61) has seven suction block assemblies (71; 171) per workpiece table (63; 163). Each of such suction block assemblies (71; 171) can be displaced individually in the longitudinal direction (5) of the machine tool (61).

A machining robot (91; 97) is arranged on each of the longitudinal sides of the machine bed (64) in this exemplary embodiment. Such machining robots (91; 97) can each be swiveled about a swivel axis oriented in the height direction (7). In addition, the single machining robot (91; 97) has a swivel arm (92) that is configured to swivel about a horizontal axis relative to the base (93). Further, the single machining robot (91; 97) has a swivel head (94) that is rotatable relative to the swivel arm (92). Each of the machining robots (91; 97) can additionally be displaceable relative to the machine bed (64) in the longitudinal direction (5) and/or in the transverse direction (6). The two machining robots (91; 97) are designed in such a way that each machining robot (91; 97) can machine workpieces (1; 2) on both workpiece paths (62; 162).

In the illustration, the machining robot (91) standing on the right in the conveying direction (112) has a tool unit (95) for cutting machining tasks, for example for milling and/or drilling operations. This tool unit (95) comprises, for example, at least one drilling tool (96).

In this exemplary embodiment, the second machining robot (97) carries a gluing unit (98) as a tool unit (98). The gluing unit (98) can be used, for example, to coat the workpiece (1; 2) by means of a joining process.

Figure 2:
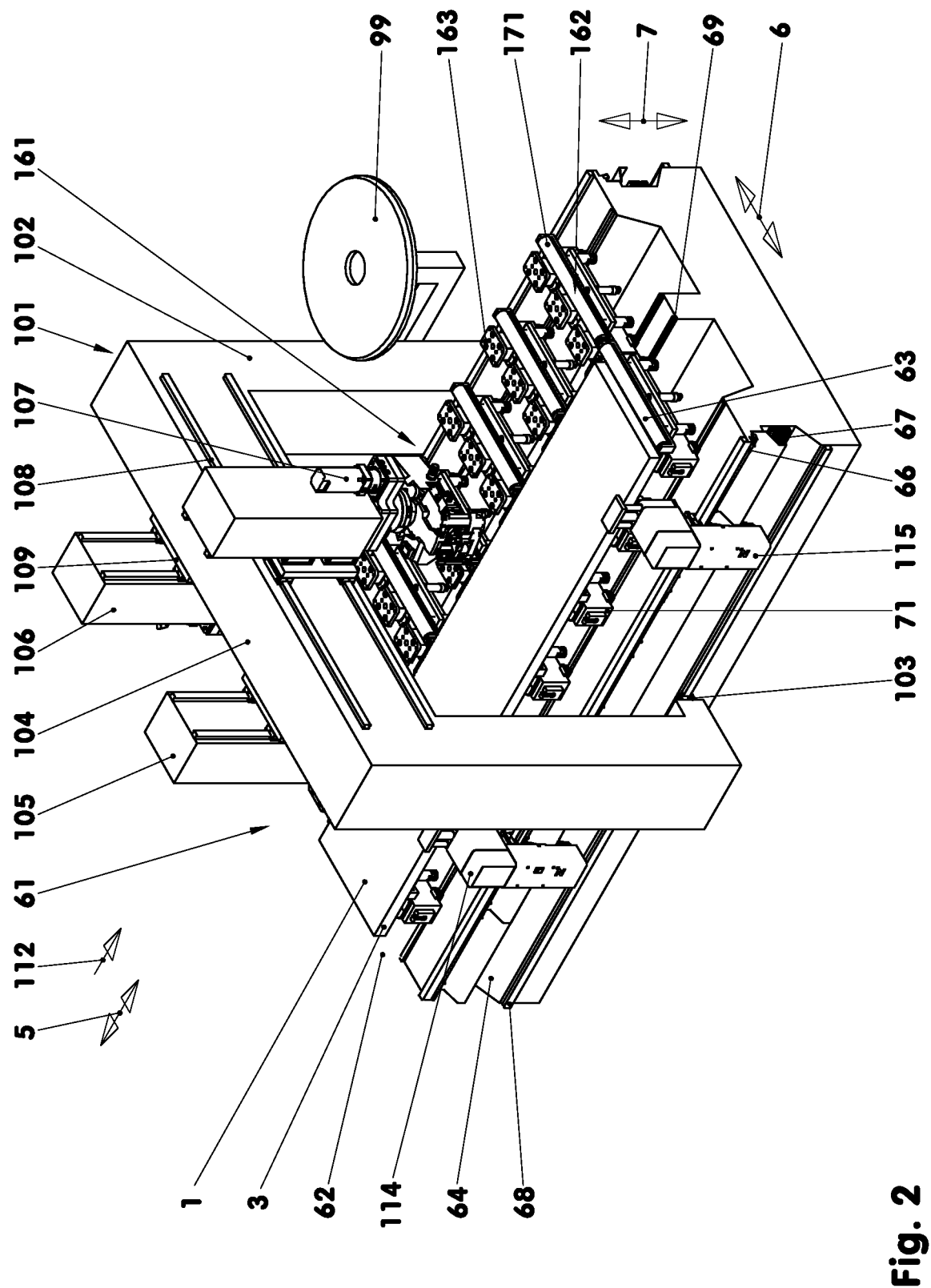
FIG. 2: Machine tool with tool gantry.

FIG. 2 shows a variant of the machine tool (61). The machine bed (64) with the workpiece tables (63; 163) and the workpiece carriages (114-117) is constructed as described in connection with the first exemplary embodiment. However, such machine tool (61) does not have machining robots (91, 97), but a tool gantry (101) displaceable in the longitudinal direction (5). The tool gantry (101) is guided along tool gantry guide rails (68) arranged on the machine bed (64). The tool gantry (101) straddles the workpiece carriages (114-117), such that the workpiece carriages (114-117) travel within the tool gantry (101).

The tool gantry (101) has a U-shaped gantry carrier (102). At the free ends of the gantry carrier (102), for example, recirculating ball bearing units (103) are arranged, which embrace the tool gantry guide rails (68). The upper central beam (104) of the gantry carrier (102) supports the tool units (105-107). For this purpose, the central beam (104) has support and guide rails (108) running in the transverse direction (6). The support and guide rails (108) are arranged on both end faces of the central beam (104) pointing in the longitudinal direction (5). Each of the tool units (105-107) is mounted on such support and guide rails (108) by means of a cross slide (109). Thus, the individual tool unit (105; 106; 107) can be displaced in the transverse direction (6) and in the height direction (7) oriented normal to the conveying plane. Each of the tool units (105; 106; 107) can additionally be designed to be displaceable relative to the tool gantry (101) in the longitudinal direction (5). All tool units (105-107) may machine workpieces (1; 2) on both workpiece paths (62; 162).

The tooling units (105-107) shown in the exemplary embodiment are, for example, a 5-axis head (105), a drilling unit (106) and a gluing unit (107).

An edge gluer (99) is also arranged on the workpiece gantry (101). This can be used to coat the edges of the workpiece (1; 2).

Figure 9:
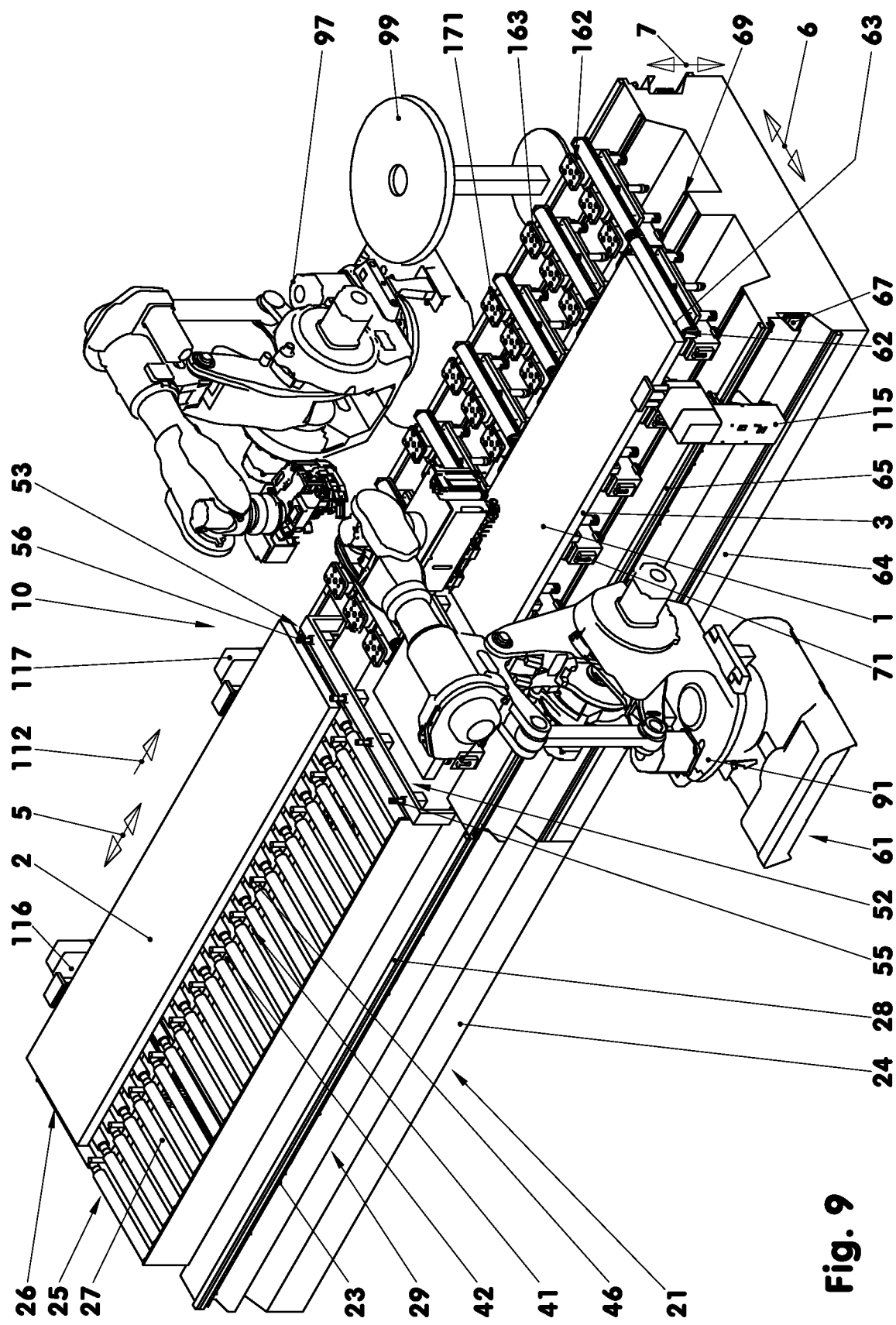
FIG. 9: Manufacturing cell.

FIGS. 3-6 show a workpiece carriage (114; 115; 116; 117), see FIG. 9. For example, all workpiece carriages (114; 115; 116; 117) are identical in design. In the exemplary embodiment, two of the workpiece carriages (114, 115) are assigned to the first workpiece path (62) and two further workpiece carriages (116, 117) are assigned to the second workpiece path (162). It is also possible to use more or fewer than the number of workpiece carriages (114-117) shown.

Figure 3:
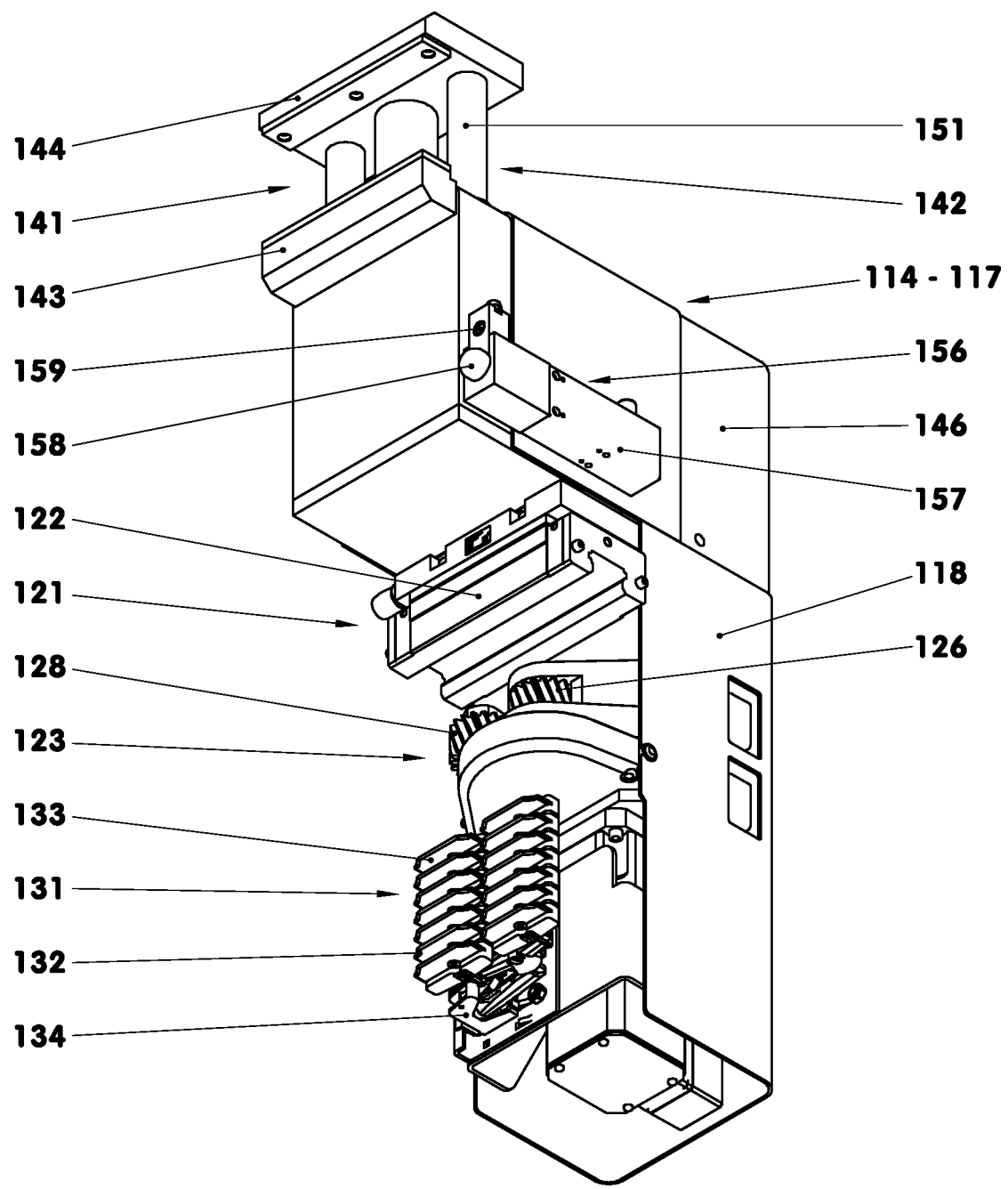
FIG. 3: Workpiece carriage.
Figure 4:
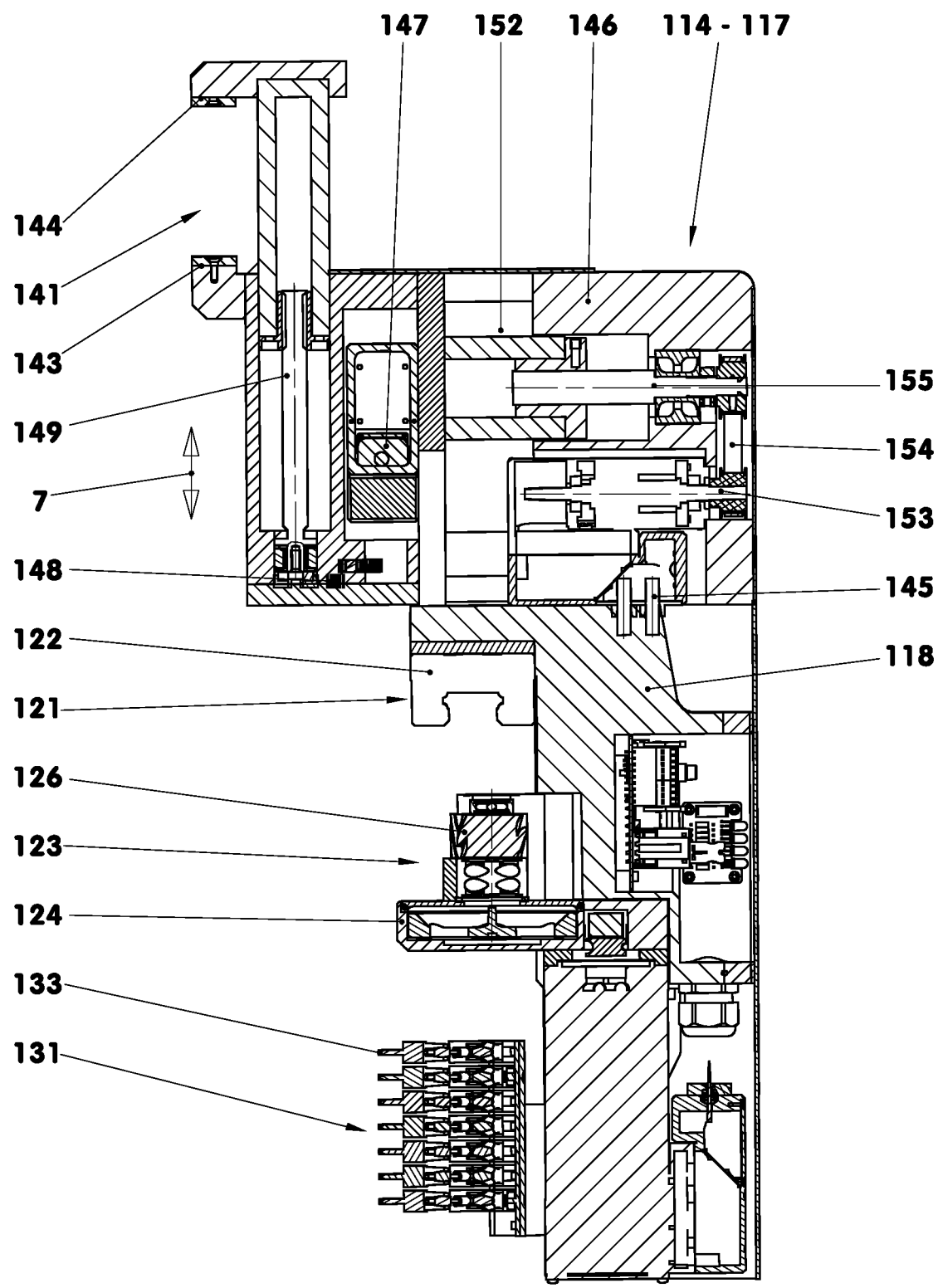
FIG. 4: Cross-section of the workpiece carriage.

The single workpiece carriage (114; 115; 116; 117), see FIGS. 3 and 4, has a guide unit (121), a drive unit (123), a current and signal transmission assembly (131) and a workpiece gripping unit (141). The above units (121, 123, 131, 141) are integrated into a two-part housing (118, 146). In the exemplary embodiment, a docking coupling (156) is arranged on the external side of the housing (118, 146).

The guide unit (121) comprises a recirculating ball bearing unit (122) that, when the workpiece carriage (114; 115; 116; 117) is mounted, engages around the workpiece carriage guide rail (65) of the machine tool (61) in the vertical directions and in the lateral directions in rolling bearings. The guide unit (121) is arranged approximately centrally in the height direction (7), for example.

Figure 5:
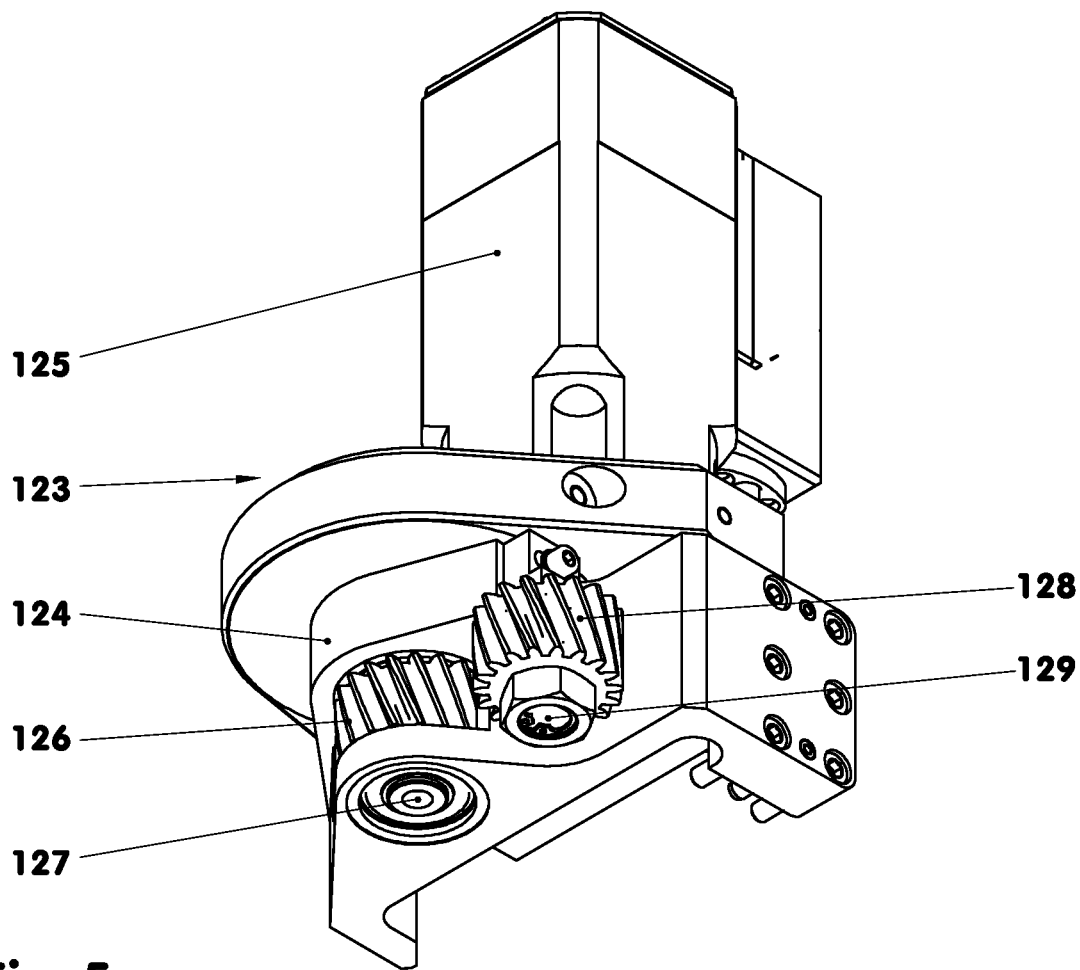
FIG. 5: Drive unit of the workpiece carriage.

The drive unit (123), see FIG. 5, has a flange carrier (124) that carries a drive motor (125) and a drive wheel (126) driven by the latter. The drive motor (125) is, for example, a servo motor (125) that is individually controlled, for example, via the current and signal transmission assembly (131). The drive wheel (126) is coupled to the drive motor (125), for example, via a multi-stage rolling gear transmission. The shaft (127) of the drive wheel (126) is mounted in rolling bearings in the flange carrier (124). In the illustrated exemplary embodiment, the drive wheel (126) is designed with helical teeth. During the operation of the workpiece carriage (114-117), the drive gear (126) meshes with the toothed rack (66) of the machine tool (61).

A lubrication wheel (128) is rotatably mounted in the flange carrier (124) at a distance from the drive wheel (126). The lubrication wheel (128) is also designed with helical teeth and meshes with the toothed rack (66) during operation. For example, the lubrication wheel (128) is designed as a felt wheel. The lubrication wheel (128) can have a different diameter than the drive wheel (126). For example, the flanks of the lubrication wheel (128) are wetted with lubricant, for example an oil from a lubrication unit, via a lubrication wheel shaft (129) mounted in the flange carrier (124). This lubricant is transferred to the toothed rack (66) during rolling. Another design of toothed rack lubrication is also conceivable.

In the exemplary embodiment, the current and signal transmission assembly (131) has two contact assemblies (132), each with seven contact elements (133) arranged one above the other. All contact elements (133) have the same design and are held, for example, by a parallelogram guide (134). They are spring-loaded in the direction turned away from the housing (118). During operation, the contact elements (133) are in contact with the power and signal conductor paths (67) of the machine bed (64). For example, different voltages, control signals and data are transmitted to the current and signal transmission assembly (131). In this case, the transfer of the individual contact element (133) can be unidirectional or bidirectional. From the workpiece carriage (114; 115; 116; 117), for example, a position signal, for example one that is permanent, is transferred to the power and signal conductor paths (67). If necessary, the control and data signals may also be transmitted wirelessly between a central controller, for example, and the workpiece carriages (114-117).

The workpiece gripping unit (141) is arranged above the guide unit (121). It comprises a parallel gripping device (142), for example one actuated by an electric motor, with two clamping jaws (143, 144) movable relative to one another and a transverse adjustment device (152). The opening and closing directions of the parallel gripping device (142) are oriented in the height direction (7). In the exemplary embodiment, the entire workpiece gripping unit (141) is mounted in a floating manner in the height direction (7) relative to the guide unit (121). For this purpose, for example, two guide pins (145) are used to guide the upper housing (146) of the workpiece carriage (114; 115; 116; 117) including the workpiece gripping unit (141) relative to the lower housing (118). In the illustration of FIG. 4, the workpiece gripping unit (141) is shown in the lowest position. For example, the upper housing (146) rests on the lower housing (118). Another design of such floating bearing is also conceivable. For example, the workpiece gripping unit (141) can be mounted on a floating saddle. It is also conceivable to use an active height adjustment of the workpiece gripping unit (141) relative to the guide unit (121), for example by means of a threaded spindle or a lifting cylinder.

In the exemplary embodiment, the lower clamping jaw (143) is rigidly arranged in the height direction (7) relative to the upper housing (146). The upper clamping jaw (144) can be displaced relative to this. To actuate the parallel gripping device (142), a clamping motor (147) drives a threaded spindle (149) via a rolling gear transmission (148), which moves the upper clamping jaw (144) along two support columns (151).

However, it is also conceivable to displace both clamping jaws (143, 144) relative to the housing (118, 146) of the workpiece carriage (114; 115; 116; 117). They can be uniformly or asymmetrically adjustable. With an asymmetrical design, for example, the lower clamping jaw (143) can have a shorter stroke than the upper clamping jaw (144). Both clamping jaws (143, 144) can also be driven individually.

The parallel gripping device (142) can also be displaced relative to the upper housing (146) in the transverse direction (6) by means of the transverse adjustment device (152). The transverse adjustment device (152) comprises an adjusting motor (153), which drives an adjustment spindle (155) via a belt drive (154). Guide cylinders (not shown here) stabilize the transverse adjustment device (152).

In the normal operating position, the transverse adjustment device (152) is extended. However, for individual machining operations on the workpiece (1, 2), for example for machining the longitudinal edge (3), the transverse adjustment device (152) can be displaced into a retracted standby position. When the transverse adjustment device (152) is retracted, the parallel gripping device (142) travels in the transverse direction (6) in the direction turned away from the workpiece (1; 2).

In the exemplary embodiment, the docking coupling (156) is attached to the external side of the upper housing (146). However, it is also conceivable to attach the docking coupling (156) to the lower housing (118). For example, it is then rigidly arranged relative to the guide unit (121). In this case, the docking coupling (156) can be attached to the lower housing (118) by means of a bracket, for example.

Figure 6:
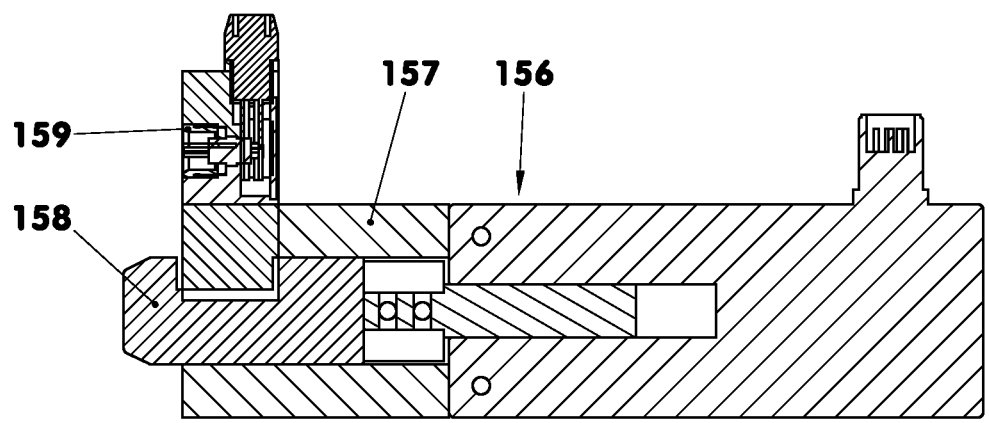
FIG. 6: Section of the docking coupling.

FIG. 6 shows a simplified sectional view of the docking coupling (156). The docking coupling (156) has a docking housing (157), in which a plunger (158) displaceable in the transverse direction (6) is mounted. The plunger (158) carries a plug (159) that can be displaced together with the plunger (158). The plug (159) is designed as an angled plug (159), for example. The output of the plug (159) points in the stroke direction of the plunger (158). The plug (159) can be used to transmit electrical power, data and/or media, for example compressed air for pneumatic functions. In the exemplary embodiment, a suction block assembly (71; 171) of the machine tool (61) can be coupled to the docking coupling (156).

Figure 7:
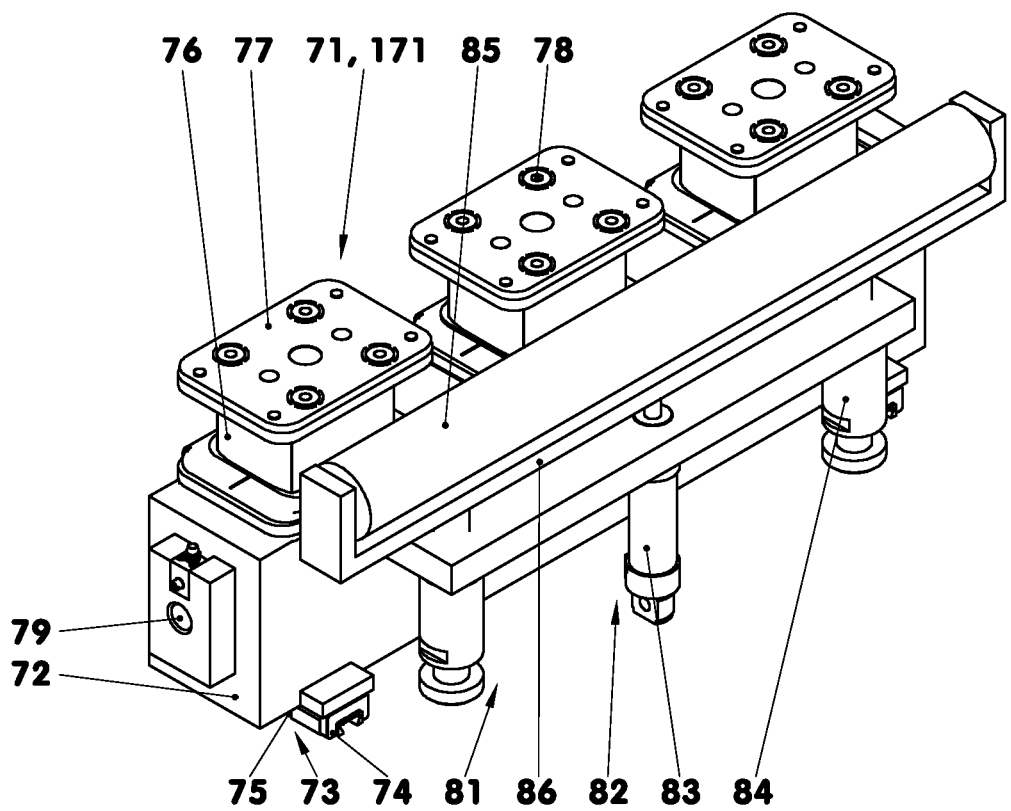
FIG. 7: Suction block assembly.
Figure 8:
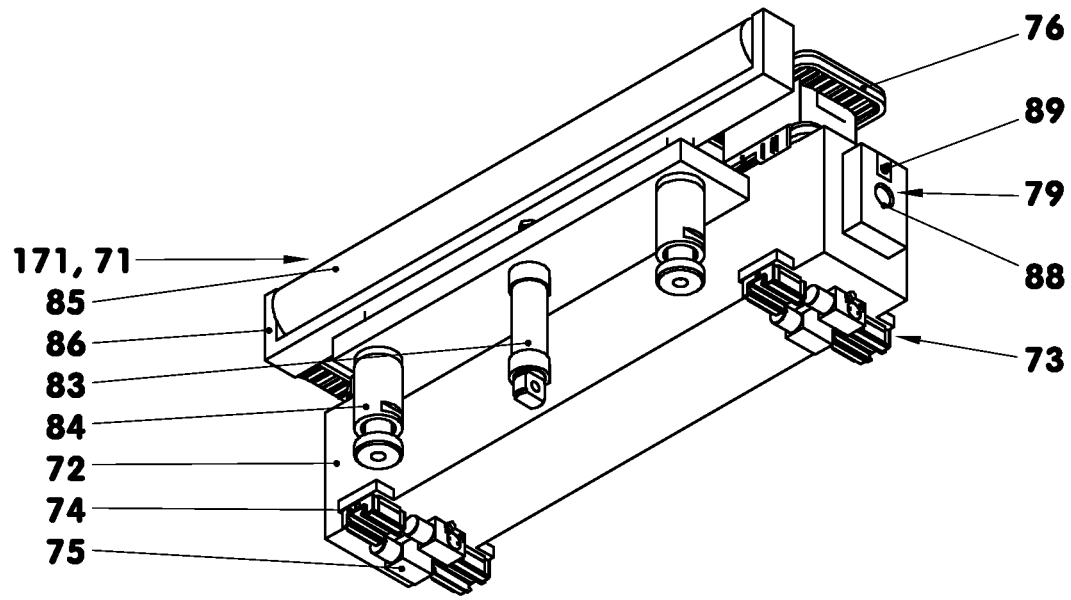
FIG. 8: Bottom view of a suction block assembly.

FIG. 7 shows an isometric view of a suction block assembly (71; 171). FIG. 8 shows a bottom view of a suction block assembly (171; 71) of the other workpiece path (162; 62), which is formed to be a mirror image of this. All suction block assemblies (71; 171), for example, are constructed in the same way. The single suction block assembly (71; 171) has a support beam (72) with two guide assemblies (73) for guidance along suction block guide paths (69) of the machine bed (64). The single guide assembly (73) has two guide shoes (74) spaced apart in the longitudinal direction (5), between which a hydraulically or pneumatically releasable clamping device (75) is located. This, for example, spring-loaded closing clamping device (75) secures the position of the suction block assembly (71; 171) relative to the machine bed (64) in the longitudinal direction (5).

The support beam (72) is oriented in the transverse direction (6). For example, it carries three suction elements sitting next to one another (76). These have an approximately rectangular suction surface (77) with four suction cups (78). In the exemplary embodiment, the suction elements (76) are designed to be individually adjustable in height. However, they can also be designed to be rigid. Each suction element (76) and/or suction cup (78) can be controlled individually with negative pressure.

A support device (81) is arranged on the support beam (72). This support device (81) has a lifting device (82) that has a central lifting cylinder (83) and two guide cylinders (84). The lifting device (82) carries a transverse support roller (85). The support roller (85) is rotatably mounted in a U-shaped support beam (86), for example. A rigid arrangement of the individual support roller (85) is also conceivable. The lifting device (82) is designed in such a way that the support plane lying parallel to the conveying plane and tangent to the upper surface line of the support roller (85) can be adjusted from a standby position lying below the suction surface (77) to a support position lying above the suction surface (77).

A support beam coupling (79) is arranged at the end face of the support beam (72). This is designed, for example, to complement the docking coupling (156) of the workpiece carriages (114-117). The support beam coupling (79) has a plunger holder (88) for receiving the plunger (158) and a socket (89) for coupling with the plug (159) of the docking coupling (156).

FIG. 9 shows a manufacturing cell (10) with a machine tool (61) according to FIG. 1 and with a workpiece supply (21) connected upstream of it. The manufacturing cell (10) can also include a machine tool (61) shown in FIG. 2.

In the manufacturing cell (10), the two workpiece paths (62, 162) continue in the workpiece supply (21). The workpiece supply (21) has a plurality of load-bearing rollers (27) for this purpose. These are arranged in two adjacent load-bearing roller paths (25, 26). Workpiece carriage guide paths (28), electrical and signal conductor paths (29) and toothed racks (23) are arranged laterally on the bed (24) of the workpiece supply (21) and are aligned with the corresponding components (65, 66, 67) of the machine tool (61). The workpiece carriages (114-117) can thus travel from the workpiece supply (21) to the machine tool (61) and back.

A transverse thrust device (41) is arranged below the load-bearing roller paths (25, 26). In the exemplary embodiment, the transverse thrust device (41) has a height-adjustable rake (42), the tines (46) of which project beyond the load-bearing roller paths (25, 26) in the illustration shown. The rake (42) is oriented in the longitudinal direction (6) and is designed to travel in the transverse direction (6). A workpiece (1; 2) deposited in the workpiece supply (21) can thus be moved to the workpiece carriages (114, 115; 116, 117) by means of the transverse thrust device (41). If the workpiece (1; 2) is manually aligned in the manufacturing cell (10), the transverse thrust device (41) can be omitted.

At the interface between the workpiece supply (21) and the machine tool (61), one stop device (52; 53) is arranged per workpiece path (62; 162). Each stop device (52; 53) has, for example, two lowerable stop pins (55; 56). The individual stop device (52; 53) is used, among other things, to determine the position of the workpiece (1; 2) and to release the workpiece (1; 2) for transport into the machine tool (61).

The manufacturing cell (10) can be part of an interlinked manufacturing process with a plurality of manufacturing stations. In this case, for example, a large number of workpiece carriages (114-117) are in circulation. All workpiece carriages (114-117), for example, are constructed in the same way. For example, the individual self-propelled workpiece carriages (114-117) travel back to the starting point in the workpiece supply (21) along a return path after passing through all manufacturing stations. For example, the number of workpiece carriages (114; 115; 116; 117) per workpiece path (62; 162) is at least three times the number of manufacturing stations of such workpiece path (62; 162). Thus, for example, two workpiece carriages (114, 115; 116, 117) holding a workpiece (1; 2) and at least one free workpiece carriage (114; 115; 116; 117) of the same design per workpiece path (62; 162) are located at each manufacturing cell (10).

When aligning the workpiece (1; 2), two workpiece carriages (114, 115; 116, 117) are initially positioned, for example, at any position in the longitudinal direction (5) in the workpiece supply (21). After the workpiece (1; 2) has been moved to the workpiece carriages (114, 115; 116, 117), the workpiece gripping units (141) of both workpiece carriages (114, 115; 116, 117) close. In this case, for example, the respective workpiece gripping units (141) adapt to the workpiece (1; 2) in the height direction (7) in such a way that the lower clamping jaw (143) lies in the upper tangential plane of the load-bearing rollers (27). In this case, the workpiece (1; 2) to be machined is aligned and positioned in the transverse direction (6), for example. Subsequently, the workpiece carriages (114, 115; 116, 117) displace the workpiece (1; 2) in a conveying direction (112) oriented from the workpiece supply (21) to the machine tool (61) until the workpiece (1; 2) rests against the stop device (52; 53) of the respective workpiece path (62; 162). For example, the current position of the workpiece carriages (114, 115; 116, 117) is used to determine the position of the workpiece (1; 2) relative to the workpiece carriages (114, 115; 116, 117). For example, based on the position of the workpiece (1; 2) relative to both workpiece carriages (114, 115; 116, 117) whose absolute position on the bed (24) is known, the control system receives redundant information regarding the position of the workpiece (1; 2). For example, primarily the signal of the workpiece carriage (115) standing in front in the conveying direction (112) is processed.

During workpiece transport, the two workpiece carriages (114, 115; 116, 117) are coupled to one another by means of an electric shaft, for example, such that they displace the workpiece (1; 2) uniformly. This is possible, for example, in the form of a master-slave controller. However, it is also conceivable to decouple the drive unit (123) of one of the workpiece carriages (114; 115; 116; 117). In this case, for example, only one workpiece carriage (114; 115; 116; 117) is driven to convey the workpiece (1; 2).

During the alignment of the workpiece (1; 2) and the determination of the workpiece position, the workpiece table (63; 163) is prepared in the machine tool (61) in a workpiece-specific manner. For example, the positions of the suction block assemblies (71; 171) are initially adjusted. For this purpose, for example, a workpiece carriage (114; 115; 116; 117) first travels next to the suction block assembly (71; 171) to be positioned. The docking coupling (156) is aligned with the support beam coupling (79). The plunger (158) with the plug (159) is extended from the docking housing (157) in the transverse direction (6) in the direction of the support beam (72). The plunger (158) plunges into the plunger holder (88), thereby centering the position of the workpiece carriage (114; 114; 116; 117) relative to the suction block assembly (71; 171). In this case, if necessary, the position of the suction block assembly (71; 171) relative to the coupling workpiece carriage (114; 115; 116; 117) can adapt in the longitudinal direction (5). At the same time, the plug (159) couples with the socket (89) of the suction block assembly (71; 171), such that an electrical connection and/or a signal connection is established between the workpiece carriage (114; 115; 116; 117) and the respective suction block assembly (71; 171).

Figure 10:
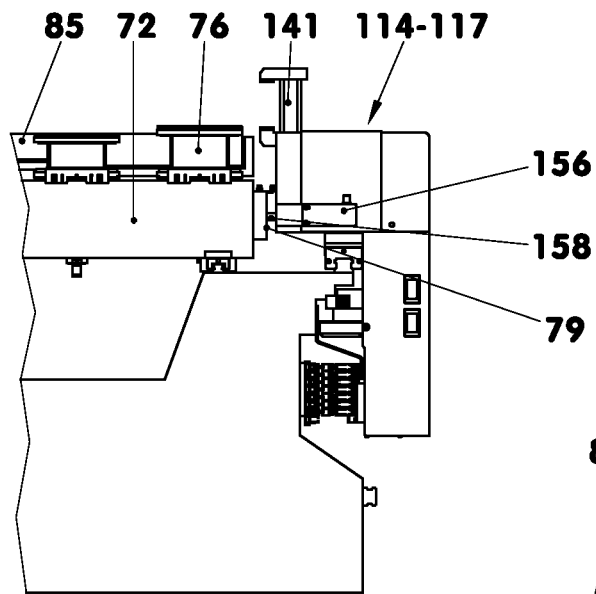
FIG. 10: Workpiece carriage with coupled suction block assembly.

FIG. 10 shows a workpiece carriage (114; 115; 116; 117) with a suction block assembly (71; 171) coupled to it. The viewing direction is oriented in the conveying direction (112), for example. For example, with the workpiece carriage (114; 115; 116; 117) coupled, the clamping device (75) of the suction block assembly (71; 171) is released at the suction block guide paths (69). The workpiece carriage (114; 115; 116; 117) displaces the respective suction block assembly (71; 171) in the longitudinal direction (5) to a predetermined, workpiece-specific position. Such position is selected in such a way that damage to the elements of the workpiece table (63; 163) is prevented during subsequent workpiece machining. As soon as the suction block assembly (71; 171) has reached such position, the clamping devices (75) of the suction block assembly (71; 171) are activated.

The coupling between the workpiece carriage (114; 115; 116; 117) and the suction block assembly (71; 171) can also be designed differently. For example, in the coupled state, a shear flange can embrace the support beam (72) on both sides. Other force-fitting and/or positively locking couplings are also conceivable.

After positioning the individual suction block assemblies (71; 171), the workpiece carriage (114; 115; 116; 117) can be once again uncoupled from this suction block assembly (71; 171). For this purpose, the plunger (158) travels together with the plug (159) in the transverse direction (6) in the direction turned away from the suction block assembly (71; 171). The workpiece carriage (114; 115; 116; 117) is separated from the suction block unit (71; 171). It can now be used to adjust another suction block assembly (71; 171) or move out of the working region (161) of the machine tool (61). The position of the individual suction block assembly (71; 171) is stored in the controller of the machine tool (61).

Figure 11:
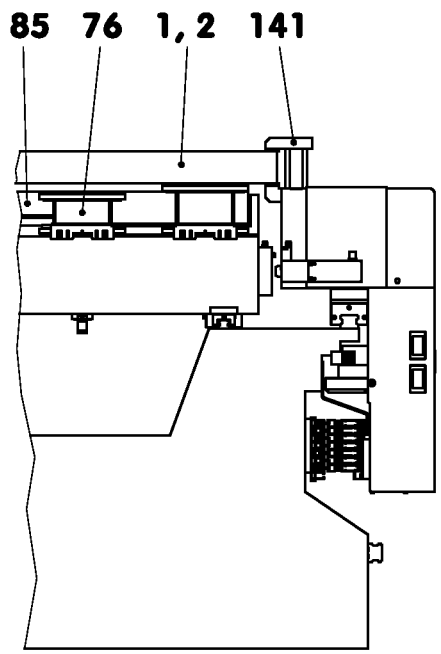
FIG. 11: Workpiece carriage with gripped workpiece.
Figure 12:
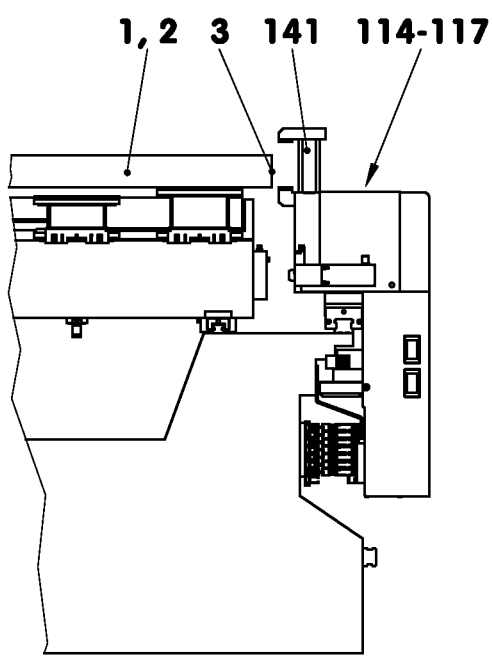
FIG. 12: Workpiece carriage with retracted gripping unit.

In each individual suction block assembly (71; 171), all suction elements (76) that are located in the machining region provided for the workpiece (1; 2) are lowered. In the illustrations of FIGS. 10-12, for example, the suction surface (77) of the left suction element (76) is lower than the suction surface (77) of the right suction element (76). Suction elements (76) that were lowered, for example, during the machining of a previous workpiece (2; 1), are also raised. This lowering can take place with the workpiece carriage (114; 115; 116; 117) coupled or with the workpiece carriage (114; 115; 116; 117) uncoupled. In the case of lowering the suction elements (76) when the workpiece carriage (114; 115; 116; 117) is coupled, such lowering can be carried out by means of control signals transmitted via the workpiece carriage (114; 115; 116; 117).

Depending on the structure of the machine tool (61), the workpiece carriages (114; 115; 116; 117) may travel to one side or both sides of a workpiece table (63; 163) for positioning the suction block assemblies (71; 171) and/or for transport of the workpiece. When arranged on both sides, for example, the drive units (123) of all workpiece carriages (114; 115; 116; 117) are synchronized with one another. In this case, for example, they follow a leading workpiece carriage (114; 115; 116; 117).

After adjusting the suction block assemblies (71; 171) of a workpiece path (62; 162), the stop devices (52; 53) of such workpiece path (62; 162) are actuated. For example, the associated stop pins (55; 56) are lowered. The workpiece carriages (114, 115; 116, 117) displace the workpiece (1; 2) to be machined in the conveying direction (112) until it lies in the planned position in the longitudinal direction (5) in the working region (161) of the machine tool (61).

The suction elements (76) are now subjected to negative pressure, for example by means of a vacuum pump. For example, the lifting devices (82) of the support rollers (85) can also be subjected to negative pressure. The support rollers (85) are lowered and the workpiece (1; 2) is drawn to the suction elements (76) that have not been lowered, see FIG. 11. It is also conceivable to control the lifting devices (82) of the support rollers (85) separately. When the workpiece (1; 2) is sucked in by the suction elements (76), the workpiece gripping units (141) of the workpiece carriages (114 115; 116, 117) remain closed. They are lowered relative to the guide units (121) during the suction in of the suction elements (76), for example, by means of the floating bearing. After fixing the workpiece (1; 2) on the workpiece table (63; 163), the workpiece (1; 2) is also positioned in the height direction (7).

After the workpiece (1; 2) has reached its working position on the workpiece table (63; 163), machining commences by means of the tool units (95; 98; 99; 105; 106; 107). For example, all tool units (95; 98; 99; 105; 106; 107) of the machine tool (61) can be used to machine the workpiece (1; 2). Depending on the machining operations to be performed, the workpiece gripping units (141) of the workpiece carriages (114; 115; 116; 117) may remain closed or be opened. If machining of the longitudinal edge (3) of a workpiece (1; 2) is carried out, for example, the workpiece gripping unit (141) is moved out of a possible collision region by means of the transverse adjustment device (152).

FIG. 12 shows the position of the workpiece carriage (114; 115; 116; 117) relative to the workpiece (1; 2) for machining the outer longitudinal edge (3). The workpiece gripping unit (141) is open. The transverse adjustment device (152) has displaced the workpiece gripping unit (141) relative to the outer suction element (76) far enough in the transverse direction (6) such that a finger milling cutter, for example, can dip into the resulting gap. After the edge machining is finished, the workpiece carriage (114; 115; 116; 117) can once again grip the workpiece (1; 2). In this case, the workpiece gripping unit (141) can grip the workpiece (1; 2) either at the same location as before or at a different location. For example, the workpiece carriage (114; 115; 116; 117) can travel in the longitudinal direction (5) for this purpose.

After the workpiece (1; 2) has been machined, the pressure in the suction elements (76) is increased to the ambient pressure when the workpiece gripping units (141) are closed. For example, the lifting devices (82) are activated and the support rollers (85) are lifted at the same time. For example, the workpiece gripping unit (141) is lifted relative to the guide unit (121) along the guide pins (145). Now, the machined workpiece (1; 2) can be conveyed out of the working region (161) of the machine tool (61) by means of the workpiece carriages (114, 115; 116, 117).

While a first workpiece (1; 2) is being machined, a second workpiece (2; 1) to be machined can be provided. For this purpose, this second workpiece (2; 1) is aligned on the second workpiece path (162; 62). For example, the suction block assemblies (171; 71) of the second workpiece table (163; 63) are adjusted and the second workpiece (2; 1) is transported into the working region (161), as described above. Subsequently, the second workpiece (2; 1) is already ready on the second workpiece table (163; 63) when the machining of the first workpiece (1; 2) is completed. This means that the set-up time required for the individual workpiece (1; 2) is not included in the throughput time of a group of workpieces (1; 2). The machine tool (61) can thus achieve a high output rate.

Combinations of the individual exemplary embodiments are also conceivable.

LIST OF REFERENCE SIGNS

1 Workpiece
2 Workpiece
3 Longitudinal edge
5 Longitudinal direction
6 Transverse direction
7 Height direction
10 Manufacturing cell
21 Workpiece supply
23 Toothed racks
24 Bed
25 Load-bearing roller path
26 Load-bearing roller path
27 Load-bearing rollers
28 Workpiece carriage roller paths
29 Electrical and signal conductor paths
41 Transverse thrust device
42 Rake
46 Tines
52 Stop device
53 Stop device
55 Stop pin
56 Stop pin
61 Machine tool
62 Workpiece path
63 Workpiece table
64 Machine bed
65 Workpiece carriage guide rail
66 Toothed rack
67 Power and signal conductor path
68 Tool gantry guide rails
69 Suction block guide paths
71 Suction block assembly
72 Support beam
73 Guide assemblies
74 Guide shoes
75 Clamping device
76 Suction elements
77 Suction surface
78 Suction cups
79 Support beam coupling
81 Support device
82 Lifting device
83 Lifting cylinder
84 Guide cylinder
85 Support roller
86 Support beam
88 Plunger holder
89 Socket
91 Machining robot
92 Swivel arm
93 Base
94 Swivel head
95 Tool unit, drilling and milling unit
96 Drilling tool
97 Machining robot
98 Tool unit, gluing unit
99 Edge gluer
101 Tool gantry
102 Gantry carrier
103 Recirculating ball bearing units
104 Central beam
105 Tool unit, 5-axis head
106 Tool unit, drilling unit
107 Tool unit, gluing unit
108 Support and guide rails
109 Cross slide
112 Conveying direction
114 Workpiece carriage
115 Workpiece carriage
116 Workpiece carriage
117 Workpiece carriage
118 Housing
121 Guide unit
122 Recirculating ball bearing unit
123 Drive unit
124 Flange carrier
125 Drive motor, servo motor
126 Drive wheel
127 Shaft
128 Lubrication wheel
129 Lubrication wheel shaft
131 Current and signal transmission assembly
132 Contact assembly
133 Contact elements
134 Parallelogram guide 141 Gripping unit, workpiece gripping unit
142 Parallel gripping device
143 Clamping jaw, bottom
144 Clamping jaw, top
145 Guide pins
146 Housing, top
147 Clamp motor
148 Rolling gear transmission
149 Threaded spindle
151 Support columns
152 Transverse adjustment device
153 Adjusting motor
154 Belt drive
155 Adjusting spindle
156 Docking coupling
157 Docking housing
158 Plunger
159 Plug
161 Working region
162 Workpiece path
163 Workpiece table
171 Suction block assembly

The invention claimed is:

1. A workpiece carriage (114; 115; 116; 117) for workpiece transport, comprising:
a lower housing (118);
a guide unit (121) oriented in a longitudinal direction (5), the guide unit having a generally U-shaped profile arranged in a downwardly open orientation on a first side of the lower housing (118);
a current and signal transmission assembly (131) arranged on the first side of the lower housing (118) below the guide unit (121);
a drive unit (123) having a drive motor (125), the drive unit (123) being arranged on the first side of the lower housing (118);
an upper housing (146); and
a workpiece gripping unit (141) having two clamping jaws (143, 144) that can be moved relative to one another, the workpiece gripping unit (141) being mounted to the upper housing (146),
wherein the lower housing (118) and the upper housing (146) form a generally L-shaped arrangement, a first side of the upper housing (146) extending outwardly above the first side of the lower housing,
wherein the workpiece gripping unit (141) is mounted on the first side of the upper housing (146) that extends outwardly above the first side of the lower housing,
wherein the two clamping jaws (143, 144) of the workpiece gripping unit (141) can be displaced relative to one another in a height direction (7) oriented normal to the longitudinal direction (5) and normal to a transverse direction (6) oriented normal to the longitudinal direction (5),
wherein the two clamping jaws (143, 144) include an upper clamping jaw (144) and a lower clamping jaw (143) configured for clamping a workpiece (1, 2) between the upper clamping jaw (144) and the lower clamping jaw (143), and
wherein the workpiece carriage (114; 115; 116; 117) is self-propelled and configured to move relative to a machine tool (61) while the drive motor (125) is supplied with an electric current via the current and signal transmission assembly (131).

2. The workpiece carriage (114; 115; 116; 117) according to claim 1,
wherein the workpiece gripping unit (141) can be displaced relative to the guide unit (121) in the transverse direction (6).

3. The workpiece carriage (114; 115; 116; 117) according to claim 1,
wherein the workpiece gripping unit (141) can be displaced or adjusted relative to the guide unit (121) in the height direction (7).

4. The workpiece carriage (114; 115; 116; 117) according to claim 1,
wherein the guide unit (121) comprises a recirculating ball bearing unit (122) configured to engage a workpiece carriage guide rail (65).

5. The workpiece carriage (114; 115; 116; 117) according to claim 1,
wherein the current and signal transmission assembly (131) comprises a plurality of spring loaded contact elements (133) arranged one above another and configured to contact power and signal conductor paths (67) of a machine bed.

6. The workpiece carriage (114; 115; 116; 117) according to claim 1,
wherein the drive unit (123) includes a flange carrier (124) that carries the drive motor (125),
a drive wheel (126) with helical teeth, the drive wheel (126) being coupled to the drive motor (125) and configured to mesh with a toothed rack (66) of a machine tool (61), and
a lubrication wheel (128) having further helical teeth configured to mesh with the toothed rack (66) and transfer a lubricant to the toothed rack (66).

7. The workpiece carriage (114; 115; 116; 117) according to claim 1,
wherein the upper housing (146) is guided relative to the lower housing (118) by two guide pins (145) for an automatic vertical displacement of the workpiece gripping unit (141) relative to the guide unit (121).

8. The workpiece carriage (114; 115; 116; 117) according to claim 7,
wherein the upper housing (146) rests on the lower housing (118) when the wherein the workpiece gripping unit (141) is in a lowest position.

9. The workpiece carriage (114; 115; 116; 117) according to claim 7,
wherein the automatic vertical displacement in the height direction (7) is effected without active drive input.

10. A workpiece carriage (114; 115; 116; 117) for workpiece transport, comprising:
a lower housing (118);
a guide unit (121) oriented in a longitudinal direction (5), the guide unit having a generally U-shaped profile arranged in a downwardly open orientation on a first side of the lower housing (118);
a current and signal transmission assembly (131) arranged on the first side of the lower housing (118) below the guide unit (121);
a drive unit (123) having a drive motor (125), the drive unit (123) being arranged on the first side of the lower housing (118);
an upper housing (146);
a workpiece gripping unit (141) having two clamping jaws (143, 144) that can be moved relative to one another, the workpiece gripping unit (141) being mounted to the upper housing (146); and a docking coupling (156) with a plunger (158) that is displaceable in a transverse direction (6), the docking coupling (156) being mounted to the upper housing (146), wherein the lower housing (118) and the upper housing (146) form a generally L-shaped arrangement, a first side of the upper housing (146) extending outwardly above the first side of the lower housing, wherein the workpiece gripping unit (141) is mounted on the first side of the upper housing (146) that extends outwardly above the first side of the lower housing, and wherein the two clamping jaws (143, 144) of the workpiece gripping unit (141) can be displaced relative to one another in a height direction (7) oriented normal to the longitudinal direction (5) and normal to a transverse direction (6) oriented normal to the longitudinal direction (5).

11. The workpiece carriage (114; 115; 116; 117) according to claim 10, wherein the docking coupling (156) has at least one plug (159).

12. A machine tool (61), comprising:

at least one workpiece table (63; 163);

at least one tool unit (95; 98; 99; 105; 106; 107) movable relative to the workpiece table; and at least two workpiece carriages (114, 115; 116; 117) according to claim 10 that are individually displaceable in the longitudinal direction (5) along a machine bed (64) of the machine tool (61), wherein the at least one workpiece table (63; 163) has a suction block assembly (71; 171), wherein the suction block assembly (71; 171) has a support beam coupling (79) complementary to the docking coupling (156) of the workpiece carriage (114; 115; 116; 117), and wherein the suction block assembly (71; 171) can be displaced relative to the machine bed (64) in the longitudinal direction (5).

13. The machine tool (61) according to claim 12, wherein the suction block assembly (71; 171) has a clamping device (75) for blocking the suction block assembly (71; 171) relative to the machine bed (64).

14. A manufacturing cell (10) comprising the machine tool (61) according to claim 12 and a workpiece supply (21), wherein the workpiece supply (21) is arranged in series with the machine tool (61), and wherein the workpiece carriages (114; 115; 116; 117) can be displaced along the workpiece supply (21) and along the machine tool (61).

15. The manufacturing cell (10) according to claim 14, wherein the manufacturing cell (10) has two workpiece paths (62, 162).

* * * * *